(12) United States Patent
Nguyen

(10) Patent No.: US 6,742,590 B1
(45) Date of Patent: Jun. 1, 2004

(54) METHODS OF TREATING SUBTERRANEAN FORMATIONS USING SOLID PARTICLES AND OTHER LARGER SOLID MATERIALS

(75) Inventor: Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 77 days.

(21) Appl. No.: 10/235,353

(22) Filed: Sep. 5, 2002

(51) Int. Cl.$^7$ .............................................. E21B 33/138
(52) U.S. Cl. .................... 166/280.01; 166/281; 166/276
(58) Field of Search ........................... 166/280.1, 280.2, 166/281, 276

(56) References Cited

U.S. PATENT DOCUMENTS

| | | | | |
|---|---|---|---|---|
| 5,492,178 A | * | 2/1996 | Nguyen et al. | 166/276 |
| 5,501,274 A | | 3/1996 | Nguyen et al. | 166/276 |
| 5,582,249 A | | 12/1996 | Caveny et al. | 166/276 |
| 5,697,440 A | | 12/1997 | Weaver et al. | 166/276 |
| 5,775,425 A | | 7/1998 | Weaver et al. | 166/276 |
| 5,833,000 A | | 11/1998 | Weaver et al. | 166/276 |
| 5,839,510 A | | 11/1998 | Weaver et al. | 166/276 |
| 5,853,048 A | | 12/1998 | Weaver et al. | 166/279 |
| 5,871,049 A | | 2/1999 | Weaver et al. | 166/276 |
| 5,921,317 A | | 7/1999 | Dewprashad et al. | 166/208 |
| 5,924,488 A | | 7/1999 | Nguyen et al. | 166/280 |
| 5,960,878 A | | 10/1999 | Nguyen et al. | 166/276 |
| 6,047,772 A | * | 4/2000 | Weaver et al. | 166/276 |
| 6,059,034 A | * | 5/2000 | Rickards et al. | 166/280.2 |
| 6,209,643 B1 | | 4/2001 | Nguyen et al. | 166/276 |
| 6,330,916 B1 | * | 12/2001 | Rickards et al. | 166/280.2 |
| 6,439,309 B1 | * | 8/2002 | Matherly et al. | 166/276 |
| 2003/0230408 A1 | * | 12/2003 | Acock et al. | 166/297 |

FOREIGN PATENT DOCUMENTS

EP  1132569 A2  12/2001  .......... E21B/43/02

* cited by examiner

*Primary Examiner*—William Neuder
(74) *Attorney, Agent, or Firm*—Robert A. Kent; C. Clark Dougherty, Jr.

(57) ABSTRACT

Improved methods of treating subterranean formations using solid particles and other larger solid materials are provided. The methods are basically comprised of the steps of introducing a carrier fluid containing suspended solid particles which have been coated with a non-hardening tackifying agent into a subterranean formation, mixing a solid material of larger size with the tackifying compound coated solid particles whereby the solid particles stick to the larger solid material and the solid particles and larger solid material are uniformly suspended in the carrier fluid and depositing the larger solid material and the tackifying compound coated smaller solid particles in the subterranean formation.

20 Claims, No Drawings

METHODS OF TREATING SUBTERRANEAN FORMATIONS USING SOLID PARTICLES AND OTHER LARGER SOLID MATERIALS

BACKGROUND OF THE INVENTION

1. Field of the Invention

The present invention relates to improved methods of treating subterranean formations using solid particles and other larger solid materials.

2. Description of the Prior Art

Hydrocarbon producing subterranean formations penetrated by well bores are often treated by forming gravel packs of solid particles adjacent to the subterranean formation and/or fracturing the subterranean formation and depositing proppant particle packs in the fractures.

In gravel packing operations, solid particles, referred to in the art as gravel, are suspended in water or a viscous fluid at the surface and carried to the well bore in which the gravel pack is to be placed at a designed gravel concentration and pump rate. As the gravel is being placed in the well bore, the carrier fluid is either returned to the surface via the washpipe or leaked off into the formation. The gravel pack produced functions as a filter to separate formation sand and solid fines from produced fluids while permitting the produced fluids to flow into and through the well bore.

Another subterranean formation treatment is hydraulic fracturing. That is, a viscous treating fluid, referred to in the art as a fracturing fluid, is pumped through the well bore into a subterranean formation or zone to be stimulated at a rate and pressure such that fractures are formed and extended into the subterranean formation. The viscous fracturing fluid includes proppant particles, e.g., graded sand, suspended therein which are carried into the fractures. The proppant particles are deposited in the fractures when the viscous fracturing fluid is broken (the viscosity is reduced) and recovered. The proppant particles function to prevent the formed fractures from closing and the closing pressure of the fractures forms the proppant particles into packs. The proppant particle packs maintain the fractures open and form conductive channels through which produced fluids can flow to the well bore.

A problem often experienced in the use of gravel packs and propped fractures is that as formation fluids are produced, the gravel or proppant particles flow-back with the formation fluids. In addition to losing the conductivity of the fractures, the flow-back of the proppant particles with formation fluids is very detrimental in that the resulting solids in the produced formation fluids erode metal goods, plug piping and vessels and cause damage to valves, instruments and other production equipment.

In order to prevent gravel or proppant particle flow-back, other larger solid materials have been combined with the smaller particles in attempts to prevent flow-back. However, a problem encountered with the use of larger solid material with the smaller gravel or proppant particles is that the larger solid material segregates from the smaller particles by floating to the top or settling to the bottom of the carrying fluid. This in turn results in uneven distribution of the smaller particles and larger solid materials which results in the flow-back of both the smaller particles and the larger solid materials with the produced fluids.

Thus, there are needs for improved methods of treating subterranean formations utilizing small solid particles and larger solid materials whereby flow-back of the particles and materials does not occur.

SUMMARY OF THE INVENTION

The present invention provides improved methods of treating subterranean formations using solid particles and other larger solid materials which meet the needs described above and overcome the deficiencies of the prior art. A method of this invention is basically comprised of the following steps. A carrier fluid containing suspended solid particles which have been coated with a non-hardening tackifying compound is introduced into the subterranean formation. A particulate or other shaped solid material of larger size than the solid particles is mixed with the tackifying compound coated smaller solid particles suspended in the carrier fluid whereby the smaller solid particles stick to the larger solid material and the larger solid material is suspended in the carrier fluid along with the smaller solid particles. Thereafter, the larger solid material and the tackifying compound coated smaller solid particles stuck thereto are deposited in the subterranean formation so that upon flowing back fluid from the formation the smaller solid particles and the larger solid material do not flow-back.

The smaller solid particles which are coated with the non-hardening tackifying compound are selected from the group of graded sand, walnut hulls, bauxite, ceramic materials, glass materials and polymer beads. The larger solid material is selected from the group consisting of fibers, shavings, platelets, deformable particles and irregular shaped particulate or pieces.

Another method of this invention for treating a subterranean formation is comprised of the following steps. A viscous fracturing fluid containing suspended solid particles which have been coated with a non-hardening tackifying compound is introduced into fractures formed in the subterranean formation. Deformable particles of a larger size than the proppant particles are mixed with the tackifying compound coated proppant particles suspended in the fracturing fluid whereby the smaller proppant particles stick to the larger deformable particles and the deformable particles are uniformly suspended in the fracturing fluid along with the proppant particles. The deformable particles and the smaller tackifying compound coated proppant particles stuck thereto are deposited in the fractures in the subterranean formation so that upon flowing back fluid from the formation the proppant particles and the deformable particles do not flow-back.

The objects, features and advantages of the present invention will be readily apparent to those skilled in the art upon a reading of the description of preferred embodiments which follows.

DESCRIPTION OF PREFERRED EMBODIMENTS

By the present invention, improved methods of treating subterranean formations using solid particles and other larger solid materials are provided. A method of the invention basically comprises the following steps. A carrier fluid containing suspended solid particles which have been coated with a non-hardening tackifying compound is introduced into a subterranean formation. A particulate or other shaped solid material of larger size than the solid particles is mixed with the tackifying compound coated solid particles suspended in the carrier fluid whereby the smaller solid particles stick to the larger solid material and the larger solid material is uniformly suspended in the carrier fluid along with the solid particles. Thereafter, the larger solid material and the tackifying compound coated solid particles stuck thereto are deposited in the subterranean formation so that upon flowing back fluid from the formation the solid particles and the larger solid material do not flow-back.

The carrier fluid utilized in accordance with this invention is preferably selected from the group consisting of an aqueous gelled liquid, an emulsion, a foamed fluid, a viscoelastic surfactant fluid and water. Of these, an aqueous gelled liquid is preferred. The water utilized in the aqueous gelled liquid can be fresh water or salt water. The term "salt water" is used herein to mean unsaturated salt solutions and saturated salt solutions including brines and seawater. A variety of gelling agents can be included in the carrier fluid to increase the viscosity thereof and suspend the solid particles and larger solid material therein. The gelling agents can be natural and derivatized polysaccharides which are soluble, dispersible or swellable in an aqueous liquid to yield viscosity to the liquid. One group, for example, of polysaccharides which are suitable for use in accordance with the present invention includes galactomannan gums such as guar gum and the like. Modified gums such as carboxyalkyl and hydroxyalkyl derivatives like carboxymethyl guar and hydroxypropyl guar can also be employed. Doubly derivatized gums such as carboxymethylhydroxypropyl guar can also be used. Modified celluloses and derivatives thereof can also be employed. Examples of watersoluble cellulose ethers which can be used include, but are not limited to, carboxyethylcellulose, carboxymethylcellulose, carboxymethylhydroxyethylcellulose, hydroxyethylcellulose, hydroxypropylcellulose and the like. The gelling agent is included in the aqueous carrier fluid in an amount in the range of from about 0.01% to about 3% by weight of the carrier fluid.

In order to further enhance the development of the viscosity of the carrier fluid, the gelling agent used can be cross-linked by the addition of a cross-linking agent to the aqueous carrier fluid. The cross-linking agent can comprise a borate releasing compound or any of the well known transition metal ions which are capable of creating a cross-linked structure with the particular gelling agent utilized. Preferred cross-linking agents for use with the above described gelling agents include, but are not limited to, borate releasing compounds, a source of titanium ions, a source of zirconium ions, a source of antimony ions and a source of aluminum ions. When used, a cross-linking agent of the above types is included in the aqueous treating fluid in an amount in the range of from above 0.01% to about 1% by weight of the gelling agent therein.

The solid particles suspended in the carrier fluid can include, but are not limited to, graded sand, walnut hulls, bauxite, ceramic materials, glass materials and polymer beads. Of these, graded sand is preferred. The solid particles are generally included in the carrier fluid in an amount in the range of from about 0.1 pounds per gallon to about 34 pounds per gallon.

The non-hardening tackifying compound utilized in accordance with this invention can be a liquid or a solution of a compound capable of forming a non-hardening tacky coating on the proppant particles suspended in the carrier fluid.

A preferred group of tackifying compounds which can be utilized in accordance with this invention are polyamides which are liquids or insolvent solutions at the temperature of the subterranean formation to be treated such that the polyamides are, by themselves, non-hardening when present on the solid particles introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids which are reacted with polyamines. Other polyacids include trimer acids, synthetic acids produced from fatty acids, maleic anhydride, acrylic acid and the like. Such acid compounds are available from companies such as Witco, Union Camp, Chemtall and Emery Industries. The reaction products are available from, for example, Champion Chemicals, Inc.

The polyamides can be converted to quaternary compounds by reaction with methylene chloride, dimethyl sulfate, benzylchloride, diethyl sulfate and the like. Typically, the quaternization reaction can be effected at a temperature of from about 100° F. to about 200° F. over a time period of from about 4 to 6 hours.

The quaternization reaction can be employed to improve the chemical compatibility of the tackifying compound with the other chemicals utilized in the treatment fluids. Quaternization of the tackifying compound can reduce effects upon breakers in the carrier fluid and reduce or minimize the buffer effects of the compounds when present in carrier fluids.

Additional compounds which can be utilized as tackifying compounds include liquids and solutions of, for example, polyester, polyethers and polycarbamates, polycarbonates, styrene/butadiene lattices, natural or synthetic resins such as shellac and the like.

The non-hardening tackifying compound used can be coated on dry solid particles and then the coated solid particles mixed with the carrier fluid or the tackifying compound can be mixed with the carrier fluid containing suspended solid particles and coated thereon. In either procedure, the tackifying compound is coated on the solid particles in an amount of from about 0.01% to about 5% by weight of the solid particles. More preferably, the non-hardening tackifying compound is coated on the solid particles in an amount in the range of from about 0.5% to about 2% by weight of the solid particles.

The particulate or other shaped solid material of larger size than the solid particles that is mixed with the tackifying compound coated solid particles suspended in the carrier fluid can include, but is not limited to, fibers, shavings, platelets, deformable particles and irregular shaped pieces. Of these, deformable particles are generally preferred. The fibers, shavings, platelets, deformable particles and irregular shaped pieces can be formed of various solid materials including, but not limited to, glass, ceramic, rubber, silicon, plastic, polymer, resin and metal. The deformable particles are preferably formed of rubber coated proppant, resin beads, soft metal particulates, resin coated metal particulates and the like.

When the larger solid material is mixed with the tackifying compound coated solid particles suspended in the carrier fluid, the tackifying compound coated solid particles stick to the larger solid material and as a result, the larger solid material is uniformly suspended in the carrier fluid along with the solid particles. As mentioned, without the tackifying compound coating on the solid particles suspended in the carrier fluid, the larger solid material either floats to the top of the carrier fluid or settles to the bottom of the carrier fluid depending upon the physical property differences between the solid particles and the larger solid material such as size, shape, specific gravity, etc.

The larger solid material is mixed with the tackifying compound coated solid particles in an amount in the range of from about 0.1% to about 100% by weight of the tackifying compound coated solid particles.

Another method of the present invention for treating a subterranean formation is comprised of the following steps. A viscous fracturing fluid containing suspended proppant particles which have been coated with a non-hardening tackifying compound is introduced into fractures formed in the subterranean formation. Deformable particles of larger size than the proppant particles are mixed with the fracturing fluid and the tackifying compound coated proppant particles suspended therein whereby the proppant particles stick to the deformable particles and the deformable particles are uniformly suspended in the fracturing fluid along with the proppant particles. The deformable particles and the tackifying compound coated proppant particles stuck thereto are deposited in the fractures in the subterranean formation so that upon flowing back fluid from the formation the proppant particles and the deformable particles do not flow-back.

The viscous fracturing fluid and the non-hardening tackifying compound are the same as those described above as are the proppant particles and the larger deformable particles.

A preferred method of this invention for treating a subterranean formation is comprised of the steps of: (a) introducing a carrier fluid containing suspended solid particles which have been coated with a non-hardening tackifying agent into the subterranean formation; (b) mixing a particulate or other shaped solid material of larger size than the solid particles with the carrier fluid and the tackifying compound coated solid particles suspended therein whereby the smaller solid particles stick to the larger solid material and the larger solid material is uniformly suspended in the carrier fluid along with the smaller solid particles; and (c) depositing the larger solid material and the tackifying compound coated smaller solid particles stuck thereto in the subterranean formation so that upon flowing back fluid from the formation the smaller solid particles and the larger solid material do not flow-back.

Another preferred method of the present invention for treating a subterranean formation is comprised of the steps of: (a) introducing a viscous fracturing fluid containing suspended proppant particles which have been coated with a non-hardening tackifying compound into fractures formed in the subterranean formation; (b) mixing deformable particles of larger size than the proppant particles with the fracturing fluid and the tackifying compound coated proppant particles suspended therein whereby the smaller proppant particles stick to the larger deformable particles and the larger deformable particles are uniformly suspended in the fracturing fluid along with the smaller proppant particles; and (c) depositing the larger deformable particles and the tackifying compound coated smaller proppant particles stuck thereto in the fractures in the subterranean formation so that upon flowing back fluid from the formation the smaller proppant particles and the larger deformed particles do not flow-back.

In order to further illustrate the methods of this invention, the following examples are given.

EXAMPLE 1

Without Tackifying Compound 250 grams of 20/40-mesh bauxite proppant was mixed in 300 cc of 30-lb-per-1000 gallon carboxymethylhydroxypropyl guar fracturing fluid. While stirring using an overhead stirrer, 65 grams of deformable, rubber-coated particulate was added to the proppant slurry. After stirring was stopped, the content was allowed to settle. An obvious segregation of particles was observed as most of the deformable particulate settled on top of the proppant pack.

EXAMPLE 2

With Tackifying Compound 250 grams of 20/40-mesh bauxite proppant was first coated with 2.5 cc of tackifying compound known by the trade designation "SANDWEDGE-NT™" (Halliburton Energy Services, Inc.) by stirring with an overhead stirrer. The treated proppant was then mixed with 300 cc of 30-lb-per-1000 gallon carboxymethylhydroxypropyl guar fracturing fluid. While stirring using an overhead stirrer, 65 grams of deformable, rubber-coated particulate was added to the proppant slurry. After stirring was stopped, the content was allowed to settle. In contrast to what was observed in Example 1, there was no segregation of particles among the proppant slurry. The deformable particulate distributed evenly in the proppant pack.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. A method of treating a subterranean formation comprising the steps of:
   (a) introducing a carrier fluid containing suspended solid particles which have been coated with a non-hardening tackifying agent into said subterranean formation;
   (b) mixing a deformable particulate of larger size than said solid particles with said carrier fluid and said tackifying compound coated solid particles suspended therein whereby said smaller solid particles stick to said larger deformable particulate and said larger deformable particulate is suspended in said carrier fluid along with said smaller solid particles; and
   (c) depositing said larger deformable particulate and said tackifying compound coated smaller solid particles stuck thereto in said subterranean formation so that upon flowing back fluid from said formation said smaller solid particles and said larger deformable particulate do not flow-back.

2. The method of claim 1 wherein said carrier fluid comprises at least one member selected from the group consisting of an aqueous gelled liquid, an emulsion, a foamed fluid, a viscoelastic surfactant fluid and water.

3. The method of claim 1 wherein said carrier fluid comprises an aqueous gelled liquid.

4. The method of claim 1 wherein said solid particles comprise at least one member selected from the group consisting of graded sand, walnut hulls, bauxite, ceramic materials, glass materials and polymer beads.

5. The method of claim 1 wherein said solid particles are comprised of graded sand.

6. The method of claim 1 wherein said non-hardening tackifying compound comprises at least one member selected from the group consisting of polyamides, polyesters, polyethers, polycarbamates, polycarbonates, styrene-butadiene lattices and natural and synthetic resins.

7. The method of claim 1 wherein said non-hardening tackifying compound is comprised of a polyamide.

8. The method of claim 1 wherein said non-hardening tackifying compound is comprised of a polyamide which is the condensation reaction product of a dimmer acid containing some trimer and higher oligomers and some monomer acids with a polyamine.

9. The method of claim 1 wherein said non-hardening tackifying compound is coated on said solid particles in an amount in the range of from about 0.01% to about 5% by weight of said solid particles.

10. The method of claim 1 wherein said deformable particulate is selected from the group consisting of fibers, shavings, platelets, and irregular shaped pieces.

11. The method of claim 1 wherein said larger solid material is mixed with said tackifying compound coated solid particles in an amount in the range of from about 0.1% to about 100% by weight of said tackifying compound coated solid particles.

12. A method of treating a subterranean formation comprising the steps of:

(a) introducing a viscous fracturing fluid containing suspended proppant particles which have been coated with a non-hardening tackifying compound into fractures formed in said subterranean formation;

(b) mixing deformable particles of larger size than said proppant particles with said fracturing fluid and said tackifying compound coated proppant particles suspended therein whereby said smaller proppant particles stick to said larger deformable particles and said larger deformable particles are suspended in said fracturing fluid along with said smaller proppant particles; and (c) depositing said larger deformable particles and said tackifying compound coated smaller proppant particles stuck thereto in said fractures in said subterranean formation so that upon flowing back fluid from said formation said smaller proppant particles and said larger deformable particles do not flow-back.

13. The method of claim 12 wherein said viscous fracturing fluid is comprised of an aqueous gelled fracturing fluid.

14. The method of claim 12 wherein said non-hardening tackifying compound comprises at least one member selected from the group consisting of polyamides, polyesters, polyethers, polycarbamates, polycarbonates, styrene-butadiene lattices and natural and synthetic resins.

15. The method of claim 12 wherein said non-hardening tackifying compound is comprised of a polyamide.

16. The method of claim 12 wherein said proppant particles comprises at least one member selected from the group consisting of graded sand, walnut hulls, bauxite, ceramic materials, glass materials and polymer beads.

17. The method of claim 12 wherein said proppant particles are comprised of graded sand.

18. The method of claim 12 wherein said non-hardening tackifying compound is comprised of a polyamide which is the condensation reaction product of a dimmer acid containing some trimer and higher oligomers and some monomer acids with a polyamine.

19. The method of claim 12 wherein said polyamide tackifying compound is coated on said proppant particles in an amount in the range of from about 0.01% to about 5% by weight of said proppant particles.

20. The method of claim 12 wherein said larger deformable particles are mixed with said polyamide tackifying compound coated proppant particles in an amount in the range of from about 0.1% to about 100% by weight of said polyamide tackifying compound coated proppant particles.

* * * * *